(12) United States Patent
Porter et al.

(10) Patent No.: US 8,643,702 B2
(45) Date of Patent: Feb. 4, 2014

(54) CAMERA ARRANGEMENT, CAMERA SYSTEM AND METHOD

(75) Inventors: Robert Mark Stefan Porter, Winchester (GB); Stephen Mark Keating, Lower Earley (GB); Clive Henry Gillard, Medstead (GB)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 12/956,618

(22) Filed: Nov. 30, 2010

(65) Prior Publication Data

US 2011/0164117 A1   Jul. 7, 2011

(30) Foreign Application Priority Data

Jan. 5, 2010   (GB) .................................. 1000119.6

(51) Int. Cl.
*H04N 13/02*   (2006.01)
(52) U.S. Cl.
USPC ............................................................ 348/47
(58) Field of Classification Search
USPC ............................................................ 348/47
See application file for complete search history.

(56) References Cited

U.S. PATENT DOCUMENTS

| | | | |
|---|---|---|---|
| 8,063,970 B2 * | 11/2011 | Sekiguchi | 348/333.05 |
| 2002/0167726 A1 | 11/2002 | Barman et al. | |
| 2011/0193861 A1 * | 8/2011 | Mashitani et al. | 345/419 |

FOREIGN PATENT DOCUMENTS

| | | | |
|---|---|---|---|
| FR | 2 699 296 A1 | | 6/1994 |
| FR | 2699296 A1 | * | 6/1994 |
| WO | WO 2008/073518 A2 | | 6/2008 |
| WO | WO 2008/073518 A3 | | 6/2008 |
| WO | WO 2008/141270 A2 | | 11/2008 |
| WO | WO 2008/141270 A3 | | 11/2008 |
| WO | WO 2008141270 A3 | * | 1/2009 |

OTHER PUBLICATIONS

United Kingdom Search Report issued Feb. 26, 2010, in Great Britain 1000119.6, filed Jan. 5, 2010.
U.S. Appl. No. 13/760,714, filed Feb. 6, 2013, Gillard, et al.

* cited by examiner

*Primary Examiner* — Sath V Perungavoor
*Assistant Examiner* — Jeffery Williams
(74) *Attorney, Agent, or Firm* — Oblon, Spivak, McClelland, Maier & Neustadt, L.L.P.

(57) ABSTRACT

A camera arrangement comprising a 3 dimensional image capture portion arranged to capture a first stereoscopic image composed of a first and a second image and a further camera element spaced apart from the 3 dimensional capture portion, the further camera element arranged to capture a third image, whereby the third image, when viewed with either the first or second image forms a second stereoscopic image is described. A corresponding method and camera system is also described.

15 Claims, 7 Drawing Sheets

CAMERA ARRANGEMENT, CAMERA SYSTEM AND METHOD

BACKGROUND TO THE INVENTION

1. Field of the Invention

The present invention relates to a camera arrangement, camera system and method.

2. Description of the Prior Art

FIG. 1 shows a prior art stereoscopic image capturing camera rig 100. On such a camera rig two camera elements 105 and 110 are located on a fixing portion 115. These camera elements are separated by a fixed amount (d). The fixed amount is set so that, when displayed, the maximum positive distance between the images captured by each camera is the interpupillary distance. This is the distance between the viewer's eyes and is usually around 6.5 cm. This is to ensure that the maximum positive disparity between the two displayed images is around 6.5 cm. This allows the 3 dimensional images to be viewed on the screen.

However when capturing a scene, and in particular a landscape type scene, the fixed distance between the two camera elements 105 and 110 is not suitable for all screen sizes upon which the two images will be displayed.

This is because to achieve a displacement of 6.5 cm on a cinema screen will require a displacement between the two images of around 10 pixels for a 12.48 m screen). Therefore, if the camera rig 100 were set up to capture a stereoscopic image for display on a cinema screen, then the maximum positive displacement between the two images when displayed would be around 10 pixels. However, this displacement is not suitable for a television screen. In order to achieve a displacement of 6.5 cm on a television screen, the displacement between the two images may be 125 pixels for a 1 m screen or fewer for a larger screen. Therefore, if the images captured for display on a cinema screen were to be displayed on the television screen, the 3 dimensional effect would be negligible.

However, with advancing technology, it is possible for consumers to view 3 dimensional, stereoscopic, images in their homes. This may be on a specially configured computer display or television display (with associated viewing glasses).

This results in a problem. If a cinematic production is captured for display on a cinema screen it will not be possible to view this on a television screen whilst still maintaining the 3 dimensional effect.

It is an aim of the present invention to address this problem.

SUMMARY OF THE INVENTION

According to a first aspect of the invention, there is provided a camera arrangement comprising a 3 dimensional image capture portion arranged to capture a first stereoscopic image composed of a first and a second image and a further camera element spaced apart from the 3 dimensional capture portion, the further camera element arranged to capture a third image, whereby the third image, when viewed with either the first or second image forms a second stereoscopic image.

This is advantageous because the further camera element may be positioned in dependence upon the size of screen upon which the stereoscopic images may be viewed.

The distance between the 3 dimensional image capture portion and the further camera element may be determined in accordance with the size of the screen upon which the second stereoscopic image is to be displayed.

The arrangement may further comprise a slidable portion upon which the further camera element is mountable, wherein the slidable portion is arranged to vary the distance between the 3 dimensional image capture portion and the further camera element.

According to an embodiment, there is provided a camera system comprising a camera arrangement according to embodiment connectable to an image processing unit, the image processing unit comprising: a storage medium operable to store the output from the 3 dimensional image capture portion and the further camera element in association with an identifier, and a switching unit operable to output the respective stored images to form either the first or second stereoscopic image.

The switching unit may be operable to select the respective stored images in dependence upon the size of the screen upon which the stereoscopic image is to be displayed.

The camera system may comprise a processing unit operable to activate the 3 dimensional image capture portion and the further camera element, wherein the activation corresponds to the operation of shutter glasses with which the first or second stereoscopic image will be viewed.

The 3 dimensional image capture portion and the further camera element may be activated when the respective lens in the shutter glasses is transparent.

According to another aspect of the invention, there is provided a controller operable to control a camera arrangement that captures stereoscopic images using a plurality of image capture elements, the controller comprising an activation unit operable to activate each image capture element in a predetermined sequence, wherein the predetermined sequence corresponds to the sequence of operation of shutter glasses used to view the stereoscopic images when displayed.

According to another aspect, there is provided a method of arranging cameras, comprising arranging a 3 dimensional image capture portion to capture a first stereoscopic image composed of a first and a second image, spacing a further camera element apart from the 3 dimensional capture portion, capturing a third image using the further camera element, whereby the third image, when viewed with either the first or second image forms a second stereoscopic image.

The distance between the 3 dimensional image capture portion and the further camera element may be determined in accordance with the size of the screen upon which the second stereoscopic image is to be displayed.

The method may further comprise mounting the further camera element on a slidable portion, and arranging the slidable portion to vary the distance between the 3 dimensional image capture portion and the further camera element.

The method may further comprise: storing the output from the 3 dimensional image capture portion and the further camera element in association with an identifier, and outputting the respective stored images to form either the first or second stereoscopic image.

The method may further comprise selecting the respective stored images in dependence upon the size of the screen upon which the stereoscopic image is to be displayed.

The method may further comprise activating the 3 dimensional image capture portion and the further camera element, wherein the activation corresponds to the operation of shutter glasses with which the first or second stereoscopic image will be viewed.

The method may further comprise activating the 3 dimensional image capture portion and the further camera element when the respective lens in the shutter glasses is transparent.

According to a further aspect, there is provided a method for controlling a camera arrangement that captures stereoscopic images using a plurality of image capture elements, the method comprising activating each image capture element in a predetermined sequence, wherein the predetermined sequence corresponds to the sequence of operation of shutter glasses used to view the stereoscopic images when displayed.

The invention may be embodied on a computer program containing computer readable instructions. Further, this computer program may be stored on a computer readable storage medium.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
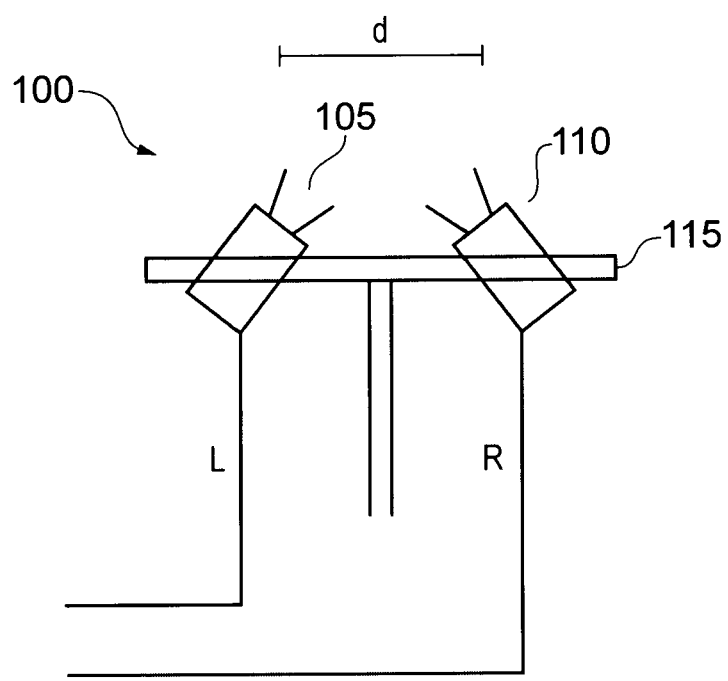
FIG. 1 shows a prior art camera rig.
Figure 2:
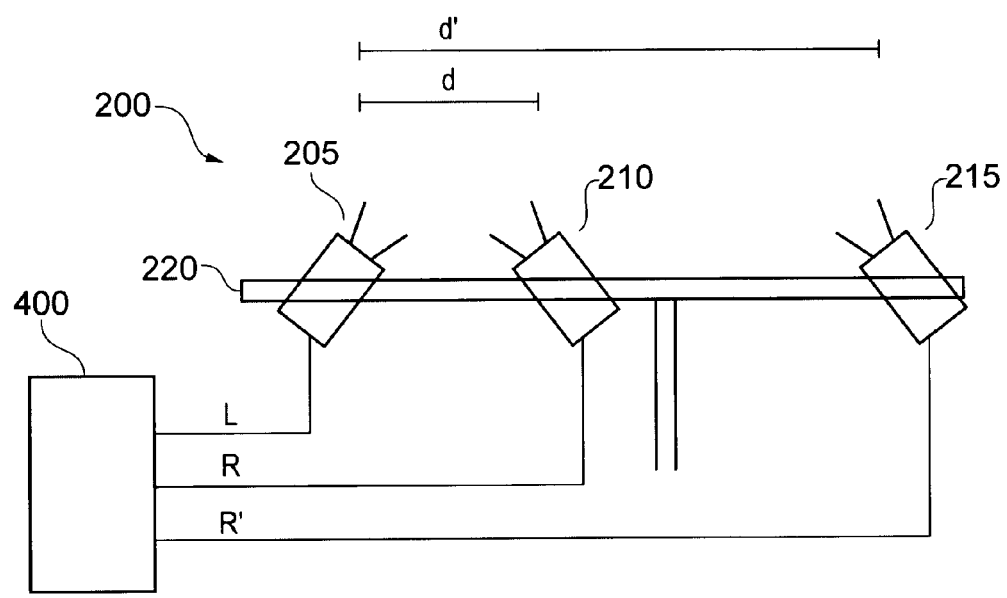
FIG. 2 shows a camera arrangement according to an embodiment of the present invention.

Referring to FIG. 2, the camera arrangement 200 has a 3 dimensional portion consisting of a first and second camera element 205 and 210, respectively mounted on a rig 220. The rig 220 is controlled by an operator. Specifically, the 3 dimensional portion has a left camera element 205 and a right camera element 210 separated by a distance d. The distance d is set to be appropriate for displaying of the stereoscopic image on a cinema screen. A typical value for d is 12 cm for a binocular camera rig or 6.5 cm preferably for a mirrored camera rig. Additionally, a third camera element 215 is provided on the rig 200. The third camera element 215 is a distance d' from the left camera element 205.

During set-up, the first and second camera element 205 and 210 are aligned such that the first and second camera element 205 and 210 are focussed on the same object. This method of aligning the first and second camera element 205 and 210 is known and so will not be explained further. Additionally, the third camera element 215 is also focussed on the object. In other words, the third camera element 215 is aligned in the same manner as the second camera element 210. This means that the third camera element 215 is focussed on the same object as the first and second camera elements 205 and 210, and so is aligned with the first and second camera elements 205 and 210.

As noted above, the third camera element 215 is located a distance d' from the left camera element 205. The distance d' is set to be appropriate for displaying of the stereoscopic image on a television screen. For example, the value of d' is 60 cm. The third camera element 215 may be fixed in a position that is d' from the left camera element 205. Alternatively, the third camera element 215 may be on a slidable mounting bracket that allows the distance between the third camera element 215 and the first camera element 205 to be varied. This increases the flexibility of the system as it allows the arrangement 200 to be varied according to the size of the television screen upon which the images are to be displayed.

Each of the first camera element 205, the second camera element 210 and the third camera element 215 has an output noted as L, R and R' in FIG. 2. These outputs are fed into an image processing device 400. This will be described later with reference to FIG. 4. However, the image processing device 400 contains a storage medium (not shown) for storage of the images output by the first, second and third camera elements. The storage medium may be a magnetic disc, or may be an optical disk, or semi-conductor memory or the like. The storage medium therefore stores an image from the first camera element 205, the second camera element 210 and the third camera element 215. On the storage medium, the images are stored in association with the respective camera element. This means that for any one scene, there are three images captured: an image from the first camera element 205, an image from the second camera element 210 and an image from the third camera element 215. These images are stored in association with each camera element within the storage medium.

The stereoscopic image is then formed from the image from the first camera element 205 and one of the images from the second camera element 210 and the third camera element 215. The selection of whether the image from the second camera element 210 or the image from the third camera element 215 is used with the image from the first camera element 205 depends on whether the stereoscopic image is to be viewed on a cinema screen or a television screen. Specifically, if the stereoscopic image is to be viewed on a cinema screen the image from the first camera element 205 and the image from the second camera element 210 will be used. Alternatively, if the stereoscopic image is to be viewed on a television screen the image from the first camera element 205 and the image from the third camera element 215 will be used.

Figure 3:
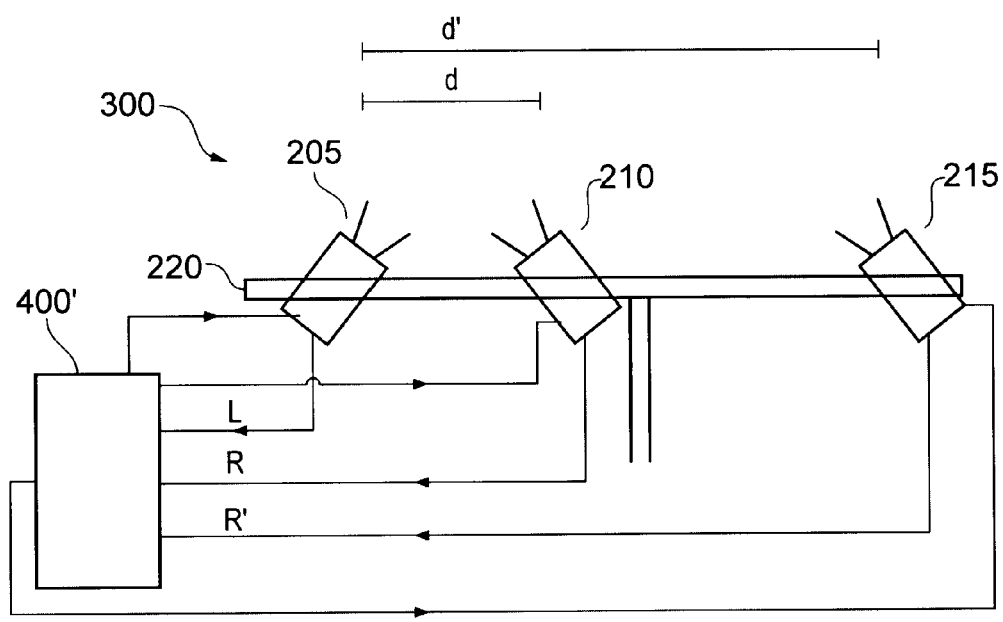
FIG. 3 shows a further camera arrangement according to an embodiment of the present invention.

Referring to FIG. 3, another embodiment of the present invention is described. This arrangement is similar to that explained in FIG. 2 with the same reference numerals referring to the same elements. As will be apparent, the camera arrangement 300 is the same as the arrangement of FIG. 2. However, the image processor 400' in FIG. 3 is different to the image processor 400 of FIG. 2. In the image processor 400' of FIG. 3, the first, second and third camera element is controlled by the image processor 400'. The image processor 400' will be described with reference to FIG. 5.

Figure 4:
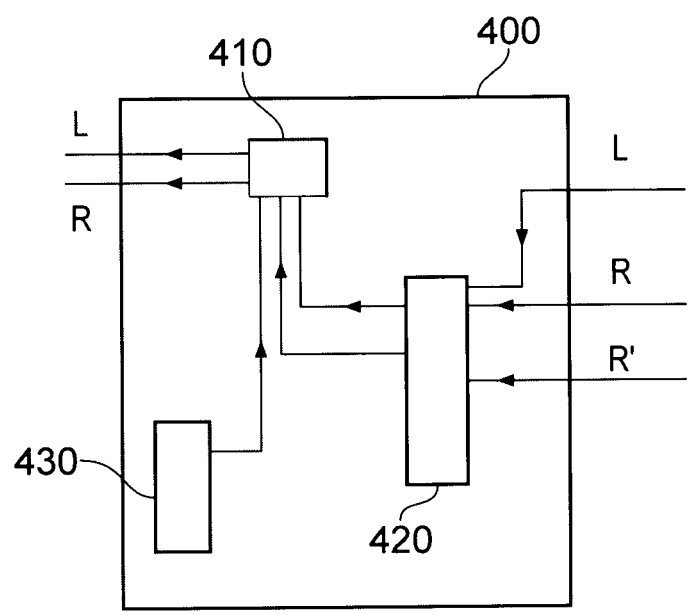
FIG. 4 shows an image processing device for receiving the images from the camera arrangement according to the embodiment described in FIG. 2.

Referring to FIG. 4, the image processor 400 contains a storage medium 420, a processor unit 430 and a switching unit 410. The storage medium 420 and the switching unit 410 are controlled by the processor unit 430.

The storage medium 420 has input thereto the output from the first, second and third camera element. The storage medium 420 stores the images output from the first, second and third camera element in a data file specific to the respective camera elements. The storage medium 420 therefore stores the images captured by the camera arrangement 200.

During editing processing, the processor unit 430 controls the storage medium 420 to transfer the images captured by the camera element appropriate to the switching unit 410. In other words, the images output from the switching unit 410 are the left image and either of the right image from the second or third camera element (R or R' respectively). This allows the editing of the appropriate images to take place.

Figure 5:
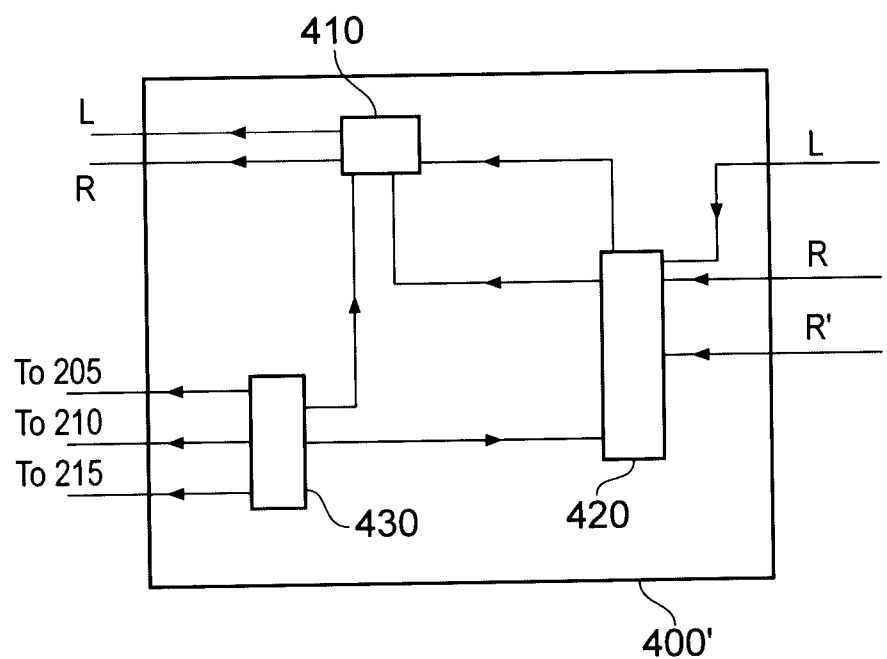
FIG. 5 shows a further image processing device for receiving the images from the camera arrangement according to the embodiment described in FIG. 3.
Figure 6:
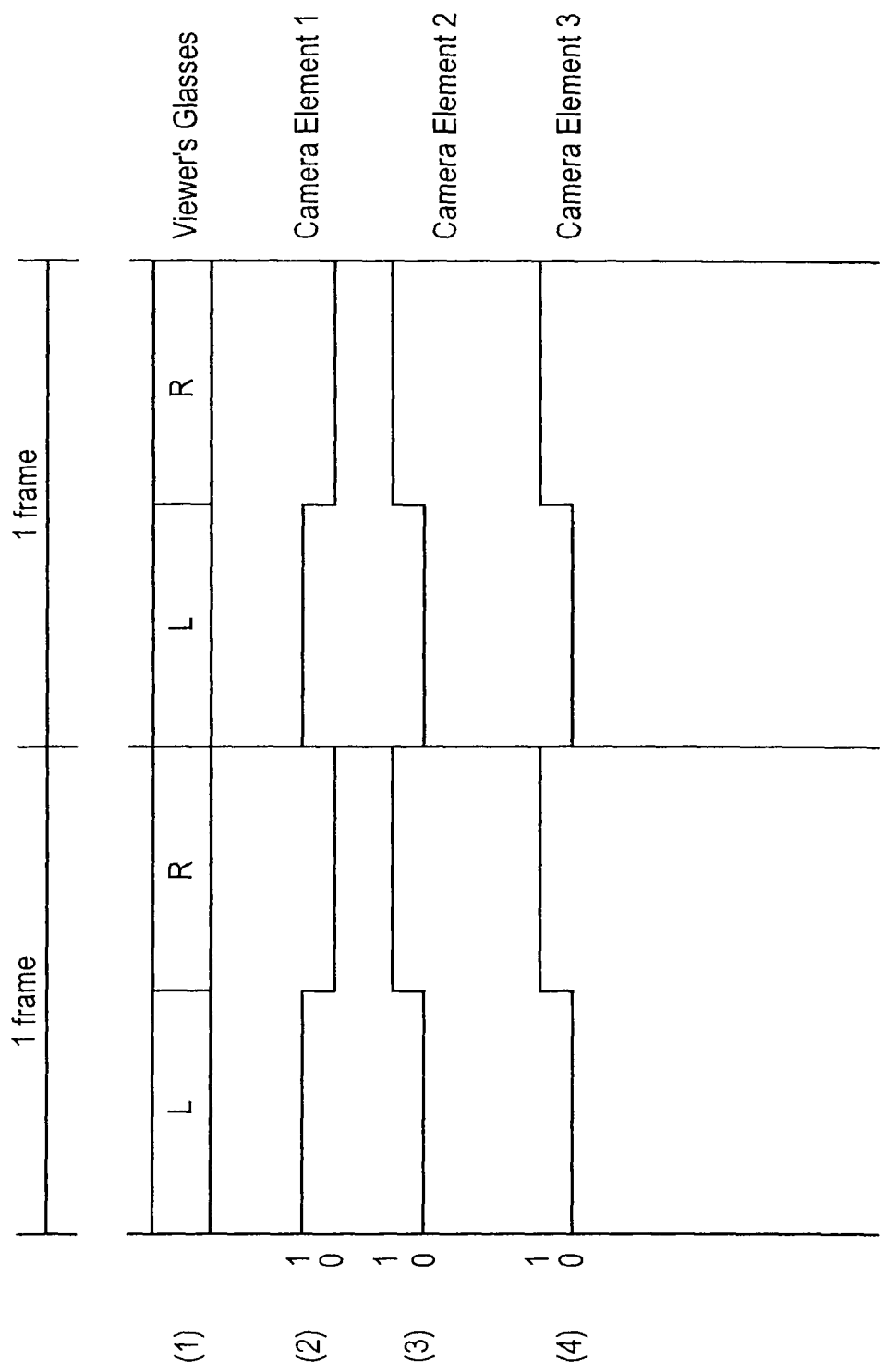
FIG. 6 shows a timing diagram showing the activation of camera elements in the arrangement of FIG. 3.

Referring to FIG. 5 and FIG. 6, the image processing unit 400' is identical to the image processing unit 400 of FIG. 3 and image processing unit 400' of FIG. 4 with the additional feature of the processing unit 430 outputting control signals to the first, second and third camera elements respectively. The purpose of the control signals will be set out below.

The storage medium 420 records the image data captured by the first, second and third camera element. However, one method by which 3 dimensional images may be displayed uses so-called shutter glasses. In other words, in the space of one video frame the image for the left eye is displayed followed by the image for the right eye. The shutter glasses block out the view of the non-viewing eye in synchronisation with displaying of the images to ensure that the correct 3 dimensional effect is realised. This is shown in graph (1) of FIG. 6. For each frame of video, firstly, the left eye is transparent and the right eye (the non-viewing eye) is made opaque, and secondly the right eye is transparent and the left eye (the non-viewing eye) is made opaque.

As noted above in the previous embodiment, the images captured by the first, second and third camera is stored on the storage medium 420. However, in order to reduce the amount of storage space required, in this embodiment, each camera element is selectively activated.

Referring to graph (2) in FIG. 6, camera element 205 which shoots the left camera footage is only activated during the period the left eye would be transparent. In other words, the first camera element 205 only shoots the footage for the half of a frame that the left eye is transparent. Similarly, the second and third camera element 210 and 215 only shoot the footage for the half of the frame that the right eye is transparent. This is shown in graphs (3) and (4) of FIG. 6 respectively. The frame rate and the sequence of shooting will be set during the set-up procedure of the camera arrangement.

In embodiments, the images captured by each camera element are captured at a rate which is a multiple of the display frame rate. So, in embodiments, each of the camera elements could capture the images at a rate of 240 frames per second. This would allow the pictures to be displayed at 24 frames per second, 60 frames per second or even 120 or 240 frames per second. A camera such as the Sony® single lens HFR camera would be appropriate for this.

When displaying the stereoscopic image, a Sony® 3D Bravia® display may be used. The Sony® 3D Bravia® display uses shuttered glasses and has MotionFlow. MotionFlow produces temporally interpolated pictures wherever necessary and displays a black frame in between the L and R pictures to reduce cross talk. In this case, the capture of the images will be varied to account for this.

Although the foregoing has been explained with reference to all the camera elements being mounted on a camera rig, the invention is not so limited. Indeed, one or more of the camera elements may not be mounted on a rig. Also, the camera elements may be mounted within the rig rather on the rig. Moreover, although the foregoing has been described with reference to binocular rigs, the invention is not so limited. In particular, the camera rig may be a mirrored rig.

Moreover, the above has been described using a 3 dimensional camera portion and a further camera element. However, the invention is not so limited. Any number of further camera elements may be used in embodiments of the invention and each may be spaced apart from the 3 dimensional camera portion by varying amounts depending upon the size of the screen upon which the image is to be displayed.

Although the foregoing has been explained with reference to the camera elements being single lens cameras each only capturing a left or right image, the invention is not so limited. For example, the invention could use multi lens cameras or a single lens camera capturing both a left and right image. For example, single lens cameras which are arranged to capture stereoscopic images are known. For example, Sony® has developed the HFR-Comfort 3D camera (noted above) which is a single lens camera capable of capturing 3 dimensional images. In embodiments, the invention can be realised using this camera. If this camera were used, then the HFR-Comfort 3D camera would include the first and second camera elements 205, 210 as noted in the embodiments.

Figure 7:
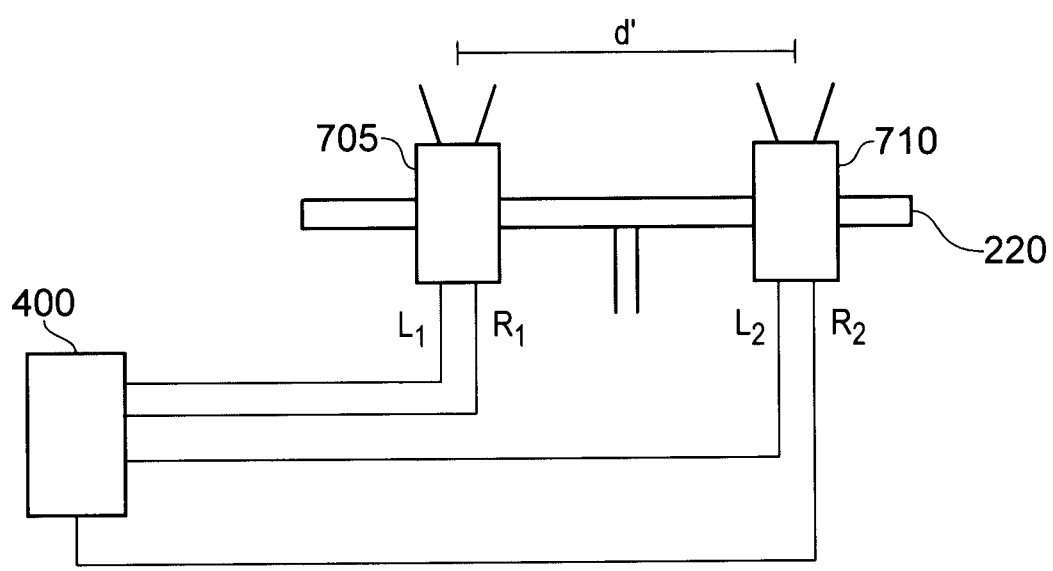
FIG. 7 shows a further embodiment of the present invention.

FIG. 7 shows this embodiment. In FIG. 7, the first and second camera element 205 and 210 are incorporated into the first 3D camera 705. Additionally, a second 3D camera 710 is provided which is a distance d' away from the first 3D camera 705. Both the first and second 3D cameras are mounted on rig 220. Each 3D camera has a left and a right output feed which are fed into image processor 400. In this case, output L1 is from a left-hand camera element located within the first 3D camera 705. Output R1 is from a right-hand camera element located within the first 3D camera 705. The spacing between the left-hand camera element and the right-hand camera element within the first 3D camera 705 is suitable for displaying the stereoscopic images on a cinema screen.

As is seen from FIG. 7, the distance between the first 3D camera 705 and the second 3D camera 710 is d'. As noted earlier, this distance is suited for display of the stereoscopic images on a television screen. So, when capturing images, it is possible for the image processor 400 to select the appropriate output feed depending upon the size of the screen onto which the stereoscopic images are to be displayed. Specifically, the image processor 400 selects feeds L1 and R1 if the stereoscopic images are to be displayed on a cinema screen. However, if the stereoscopic image is to be displayed on a television screen, the image processor 400 is arranged to select output feeds L1 and R2. Alternatively, image processor 400 could select output feeds L2 and R1.

Although FIG. 7 is shown with image processor 400, the skilled person will appreciate that image processor 400' could be used instead. In this case, control connections from the image processor 400' to each camera similar to those in FIG. 3 will be made. Also, although the second 3D camera 710 is shown, this embodiment is not so limited. Indeed, the second 3D camera 710 could be replaced by a more conventional camera. Moreover, if only 2D images are required, the image processor 400 may select a single output.

The arrangement and/or control of the image processing unit may be computer controlled. In this case, the invention may be embodied as a computer program and as a computer readable storage medium which stores such a computer program. The storage medium may be a magnetic storage medium or may be an optically readable storage medium, or even a solid-state type memory. Indeed, the computer program may be written in any computer readable language and may include instructions that are readable by a computer.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined appended claims.

We claim:

1. A camera arrangement, comprising:
   a 3 dimensional image capture portion arranged to capture a first stereoscopic image configured for display on a first screen, the first stereoscopic image being composed of a first image and a second image; and
   a further camera element spaced apart from the 3 dimensional capture portion, the further camera element arranged to capture a third image, whereby the third image, when viewed with either the first image or the second image, forms a second stereoscopic image configured for display on a second screen, and wherein the distance between the 3 dimensional image capture portion and the further camera element is determined in accordance with the size of the second screen upon which the second stereoscopic image is to be displayed, the second screen being smaller in area than the first screen.

2. The camera arrangement according to claim 1, comprising a slidable portion upon which the further camera element is mountable, wherein the slidable portion is arranged to vary the distance between the 3 dimensional image capture portion and the further camera element.

3. The camera system comprising a camera arrangement according to claim 1 connectable to an image processing unit, the image processing unit comprising: a storage medium operable to store the output from the 3 dimensional image capture portion and the further camera element in association with an identifier, and a switching unit operable to output the respective stored images to form either the first stereoscopic image or second stereoscopic image.

4. The camera system according to claim 3, wherein the switching unit is operable to select the respective stored images in dependence upon the size of the first screen or the second screen upon which the first stereoscopic image or the second stereoscopic image is to be displayed.

5. The camera system according to claim 4, comprising a processing unit operable to activate the 3 dimensional image capture portion and the further camera element, wherein the activation is dependent upon the operation of shutter glasses with which the first stereoscopic image or the second stereoscopic image will be viewed.

6. The camera system according to claim 5, wherein the 3 dimensional image capture portion and the further camera element are activated when the respective lens in the shutter glasses is transparent.

7. A controller operable to control a camera arrangement that captures a plurality of stereoscopic images using a plurality of image capture elements, the controller comprising an activation unit operable to activate each image capture element of the plurality of image capture elements in a predetermined sequence, wherein the predetermined sequence corresponds to the sequence of operation of shutter glasses used to view the plurality of stereoscopic images when displayed, the shutter glasses being configured to permit transmission of each frame of the plurality of stereoscopic images by synchronising views of a non-viewing eye and a viewing eye by alternately blocking the view of the non-viewing eye and allowing the view of the viewing eye on a frame-by-frame basis for each stereoscopic image of the plurality of stereoscopic images, and wherein the camera arrangement comprises:
a 3 dimensional image capture portion arranged to capture a first stereoscopic image configured for display on a first screen, the first stereoscopic image being composed of a first image and a second image; and
a further camera element spaced apart from the 3 dimensional capture portion, the further camera element arranged to capture a third image, whereby the third image, when viewed with either the first image or the second image, forms a second stereoscopic image configured for display on a second screen, and
wherein the distance between the 3 dimensional image capture portion and the further camera element is determined in accordance with the size of the second screen upon which the second stereoscopic image is to be displayed, the second screen being smaller in area than the first screen.

8. A method of arranging cameras, comprising:
arranging a 3 dimensional image capture portion to capture a first stereoscopic image configured for display on a first screen, the first stereoscopic image being composed of a first image and a second image;
spacing a further camera element apart from the 3 dimensional capture portion; and
capturing a third image using the further camera element, whereby the third image, when viewed with either the first image or the second image, forms a second stereoscopic image configured for display on a second screen, and
wherein the distance between the 3 dimensional image capture portion and the further camera element is determined in accordance with the size of the second screen upon which the second stereoscopic image is to be displayed, the second screen being smaller in area than the first screen.

9. The method according to claim 8, comprising mounting the further camera element on a slidable portion, and arranging the slidable portion to vary the distance between the 3 dimensional image capture portion and the further camera element.

10. The method according to claim 8, further comprising: storing the output from the 3 dimensional image capture portion and the further camera element in association with an identifier, and outputting the respective stored images to form either the first stereoscopic image or second stereoscopic image.

11. The method according to claim 10, comprising selecting the respective stored images in dependence upon the size of the first screen or the second screen upon which the first stereoscopic image or the second stereoscopic image is to be displayed.

12. The method according to claim 10, comprising activating the 3 dimensional image capture portion and the further camera element, wherein the activation is dependent upon the operation of shutter glasses with which the first stereoscopic image or the second stereoscopic image will be viewed.

13. The method according to claim 12, comprising activating the 3 dimensional image capture portion and the further camera element when the respective lens in the shutter glasses is transparent.

14. A method for controlling a camera arrangement that captures a plurality of stereoscopic images using a plurality of image capture elements, the method comprising activating each image capture element of the plurality of image capture elements in a predetermined sequence, wherein the predetermined sequence corresponds to the sequence of operation of shutter glasses used to view the plurality of stereoscopic images when displayed, the shutter glasses being configured to permit transmission of each frame of the plurality of stereoscopic images by synchronising views of a non-viewing eye and a viewing eye by alternately blocking the view of the non-viewing eye and allowing the view of the viewing eye on a frame-by-frame basis for each stereoscopic image of the plurality of stereoscopic images, and wherein the camera arrangement comprises:
a 3 dimensional image capture portion arranged to capture a first stereoscopic image configured for display on a first screen, the first stereoscopic image being composed of a first image and a second image; and a further camera element spaced apart from the 3 dimensional capture portion, the further camera element arranged to capture a third image, whereby the third image, when viewed with either the first image or the second image, forms a second stereoscopic image configured for display on a second screen, and wherein the distance between the 3 dimensional image capture portion and the further camera element is determined in accordance with the size of the second screen upon which the second stereoscopic image is to be displayed, the second screen being smaller in area than the first screen.

15. A nontransitory computer readable storage medium encoded with a computer program comprising computer readable instructions which, when loaded onto a computer, cause the computer to perform the method according to any one of claims 8 to 14.

\* \* \* \* \*